United States Patent [19]

Cocconi

[11] Patent Number: 5,355,070
[45] Date of Patent: Oct. 11, 1994

[54] INDUCTION MOTOR DRIVE STABILITY CONTROL CIRCUIT

[75] Inventor: Alan G. Cocconi, Glendora, Calif.

[73] Assignee: A. C. Propulsion, Inc., San Dimas, Calif.

[21] Appl. No.: 29,026

[22] Filed: Mar. 10, 1993

[51] Int. Cl.$^5$ ............................................. H02P 5/40
[52] U.S. Cl. .................................... 318/798; 318/801; 318/811
[58] Field of Search .................... 318/727–832, 318/138, 254, 638; 363/71, 165, 90, 91, 98

[56] References Cited

U.S. PATENT DOCUMENTS

| | | | |
|---|---|---|---|
| 3,887,852 | 6/1975 | Fernandes et al. | 318/197 |
| 4,085,355 | 4/1978 | Fradella | 318/168 |
| 4,282,473 | 8/1981 | Dreiseitl et al. | 318/803 |
| 4,322,671 | 3/1982 | Kawada et al. | 318/798 |
| 4,327,315 | 4/1982 | Kawada et al. | 318/811 |
| 4,361,791 | 11/1982 | Plunkett | 318/723 |
| 4,447,787 | 5/1984 | Schwesig et al. | 318/803 |
| 4,538,197 | 8/1985 | Breen | 361/71 |
| 4,680,526 | 7/1987 | Okuyama et al. | 318/802 |
| 4,689,543 | 8/1987 | Hucker | 318/798 |
| 4,703,245 | 10/1987 | Sakamoto et al. | 318/809 |
| 4,713,596 | 12/1987 | Bose | 318/802 |
| 4,766,360 | 8/1988 | Haraguchi et al. | 318/732 |
| 4,912,378 | 3/1990 | Vukosavic | 318/254 |
| 4,920,475 | 4/1990 | Rippel . | |
| 4,931,715 | 6/1990 | Lee et al. | 318/709 |
| 5,010,287 | 4/1991 | Mukai et al. | 318/801 |
| 5,099,186 | 3/1992 | Rippel et al. . | |
| 5,140,244 | 8/1992 | Lyons et al. | 318/701 |

Primary Examiner—Paul Ip
Attorney, Agent, or Firm—Blakely, Sokoloff, Taylor & Zafman

[57] ABSTRACT

A circuit generates phase pole command signals for controlling operation of an induction motor. To minimize instabilities occurring within the motor, a stability control circuit generates a phase shift signal, which is input to reference signal generators to adjust phase reference signals. When in a motoring mode, the phases of the reference signals are advanced monotonically with respect to the electro-motive force of the induction motor. When in a regeneration mode, the phases of the reference signals are decreased monotonically with respect to the electro-motive force. The resulting adjustment to the phases of the reference signals minimizes instabilities within the feedback control of the induction motor.

1 Claim, 2 Drawing Sheets

INDUCTION MOTOR DRIVE STABILITY CONTROL CIRCUIT

BACKGROUND OF THE INVENTION

1. Field of the Invention

The invention generally relates to electrical motor drive systems and in particular to a stability control circuit for use with an electrical induction motor.

2. Description of Related Art

Electrically powered motors are being developed and refined, particularly for use in powering automobiles. A typical drive system for an electrically powered vehicle includes a storage battery connected to one or more multiple phase induction motors through a drive control circuit. Three phase induction motors are typically used. The drive control circuit converts DC power from the battery to three-phase power signals for energizing the windings of the three phase induction motor or motors. The drive system converts electrical power to mechanical power subject to feedback control mechanisms designed to insure an adequate amount of torque at all operating vehicle speeds when the vehicle is in a "motoring" mode. A typical drive system is also capable of operating in a "regeneration" mode where the motor operates as a generator to convert mechanical energy of the moving vehicle into electrical power that may be used to recharge the on-board batteries.

Referring to FIG. 1, a typical prior art drive control circuit for use with a three phase induction motor is considered in more detail. The control circuit, shown generally as 100, receives an input phase reference signal $\theta$ on line 120. The phase reference signal is developed from the sum of a tachometer phase signal and a slip phase signal. The phase reference signal is asserted as an input to reference generators 101 and 102. The output of reference generator 101 on line 128 is a phase A reference signal; $f_1$, conforming to the following relationship:

$$f_1 = k_1 \sin(k_2 \theta)$$

where $k_1$ and $k_2$ are constants. The output of reference generator 102 on line 130 is a phase B reference signal, $f_2$, conforming to the following relationship:

$$f_2 = k_1 \sin(k_2 \theta + 2\pi/3).$$

It will be observed that the phase B reference signal corresponds to the phase A reference signal advanced by 120°.

The phase A reference signal on line 128 is asserted at the non-inverting input 108 of differential amplifier 109. The inverting input of amplifier 109 is coupled to a current sensor 108 on the phase A motor winding. Amplifier 109 compares the current sensed in the phase A winding with the phase A reference signal to generate an output error signal. In like manner, amplifier 111 compares the current sensed in the phase B motor winding with the phase B reference signal to generate a phase B error signal. A summing network and amplifier represented by block 112 generates a phase C error signal that is the negative sum of the phase A and phase B error signals. The three phase error signals are asserted at the non-inverting inputs of respective differential amplifiers 114, 115 and 116. The inverting inputs of each of these amplifiers is coupled to a triangular wave oscillator 113 operating at the switching frequency. The outputs of amplifiers 114, 115 and 116 are thus pulse width modulated signals where the percentage modulation is proportionate to the respective error signal. These outputs are then coupled to respective drivers (not shown) to control solid state switches that regulate the flow of current through the respective motor windings.

An exemplary prior art motor drive system, incorporating the conventional features described above, is described in U.S. Pat. No. 5,099,186 issued to Rippel and this inventor.

However, in conventional systems such as described above, stability problems have been observed under certain operating conditions, particularly when the motor is operating at high speed with a high torque command. Such instability has been determined to be inherent in conventional systems and is typically manifested by oscillations in the motor torque. Such lack of stability within conventional control circuits prevents effective control of the operation of the three-phase induction motors and results in non-optimal performance of the motor system.

SUMMARY OF THE INVENTION

From the foregoing, it can be appreciated that there is a need to provide an improved drive control circuit for use with a multiple phase induction motor. It is an object of the invention to provide such an improved control circuit. In particular, it is an object of the invention to provide an improved control circuit which avoids stability problems inherent in conventional control circuits.

This object, and other general advantages of the invention, is achieved by providing an improved stability control circuit for use with an electrical induction motor wherein pole command signals transmitted to poles of the induction motor are generated based on a combination of a phase reference signal and a phase shift signal, with the phase shift signal increasing monotonically with respect to the electro-motive force (e.m.f.) of the motor, thereby effectively altering the slip frequency.

In a preferred embodiment, the stability control circuit comprises:

a) a means for receiving a phase reference signal representative of a combination of a tachometer phase signal and a slip phase signal;

b) a means for generating a phase shift signal based on sensed phase voltage signals, wherein the phase shift signal increases monotonically with motor e.m.f.; and c) a means for generating phase pole command signals from the phase reference and phase shift signals.

For both the motoring and regeneration modes of the motor, an increase in magnitude of the slip frequency causes motor e.m.f. to reduce. Rather than altering a slip frequency generator which provides the slip frequency, a similar compensation effect is achieved with the present invention by adding a phase shift signal to the phase reference signal. By utilizing changes in motor e.m.f. to alter slip frequency, stability of the system is maintained for all points of motor operation.

In the preferred embodiment, the phase A and B reference signals are generated in a manner similar to prior art systems, but wherein $f_1$ and $f_2$ are given by:

$$f_1 = k_1 \sin(k_2\theta + k_3\Phi); \text{ and}$$

$$f_2 = k_1 \sin(k_2\theta + k_3\Phi + 2\pi/3).$$

In the above equations: $\theta =$ is the phase reference signal as previously discussed; $\Phi =$ is a phase shift signal; and $k_1$, $k_2$ and $k_3$ are constants.

To generate the phase shift signal $\Phi$, a phase shift signal generator is provided which develops a signal representative of average motor e.m.f. and provides an output that increases monotonically with the sensed motor e.m.f. The polarity of the phase shift signal is selectively reversed when the system operates in the regeneration mode since the slip frequency is negative in this mode.

In general, the invention provides a relatively simple and effective mechanism for maintaining stability within a control circuit for an electrically powered motor. The circuit of the invention achieves stability by modifying conventional phase reference signals to include a phase shift component. Compensation is thereby achieved without requiring a modification of the conventional slip frequency generator. Accordingly, the invention is easy to implement within a conventional electrically powered motor system by merely modifying the phase reference controller, and without modifying other components of the system.

BRIEF DESCRIPTION OF THE DRAWING

The objects and advantages of the present invention will become more readily apparent to those ordinarily skilled in the art after reviewing the following detailed description and accompanying drawings, wherein.

DETAILED DESCRIPTION OF THE INVENTION

An improved stability control circuit for an induction motor drive is disclosed. In the following description for the purpose of explanation, numerous details are set forth to provide a thorough understanding of the present invention, however, it will be apparent to one skilled in the art these details are not required in order to practice the present invention. In other instances, well known structures and circuits are shown in block diagram form in order not to obscure fundamental aspects of the invention.

Figure 1:
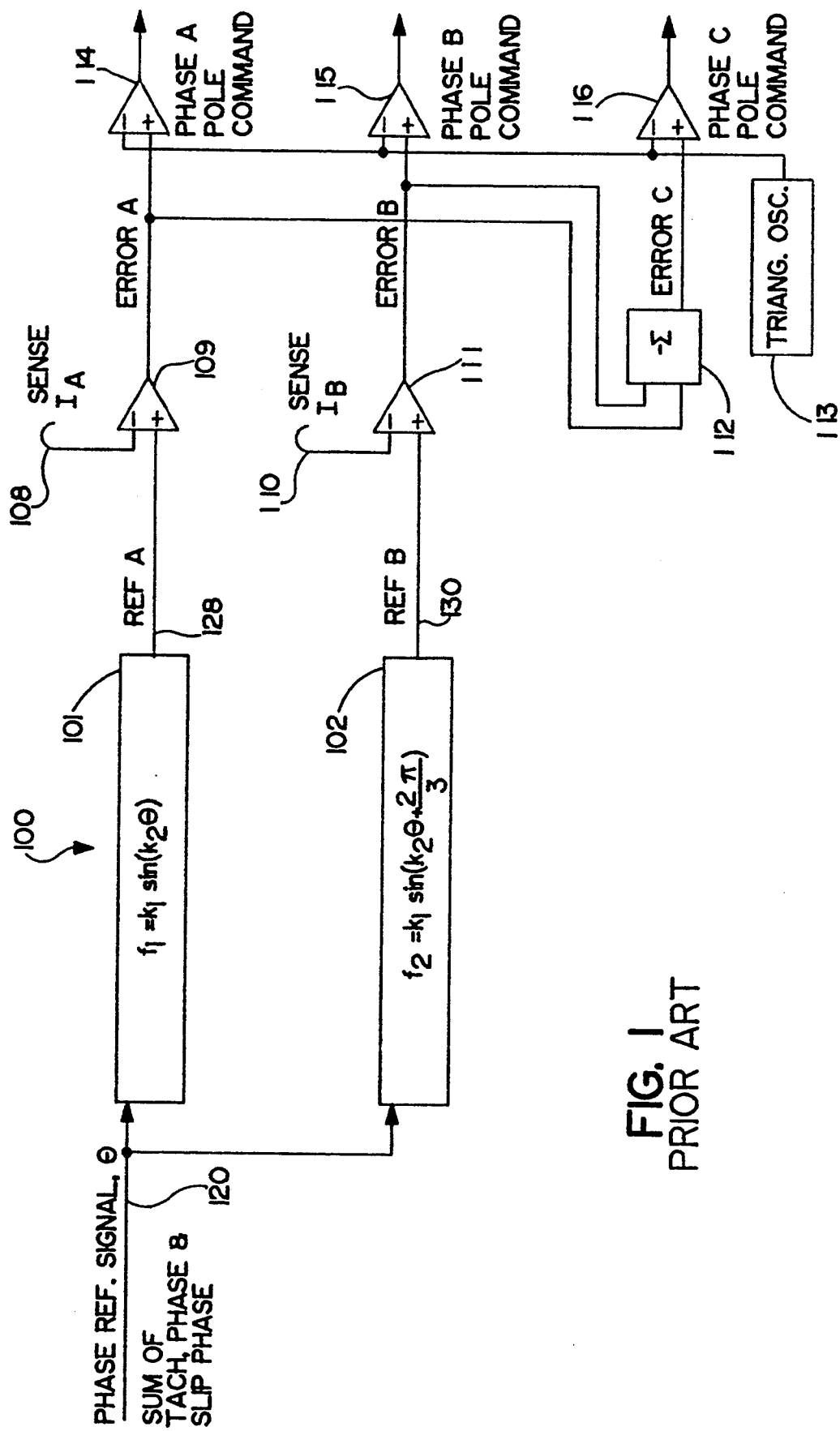
FIG. 1 the provides a schematic diagram, partially in block form, illustrating a prior art control circuit for a three-phase induction motor.
Figure 2:
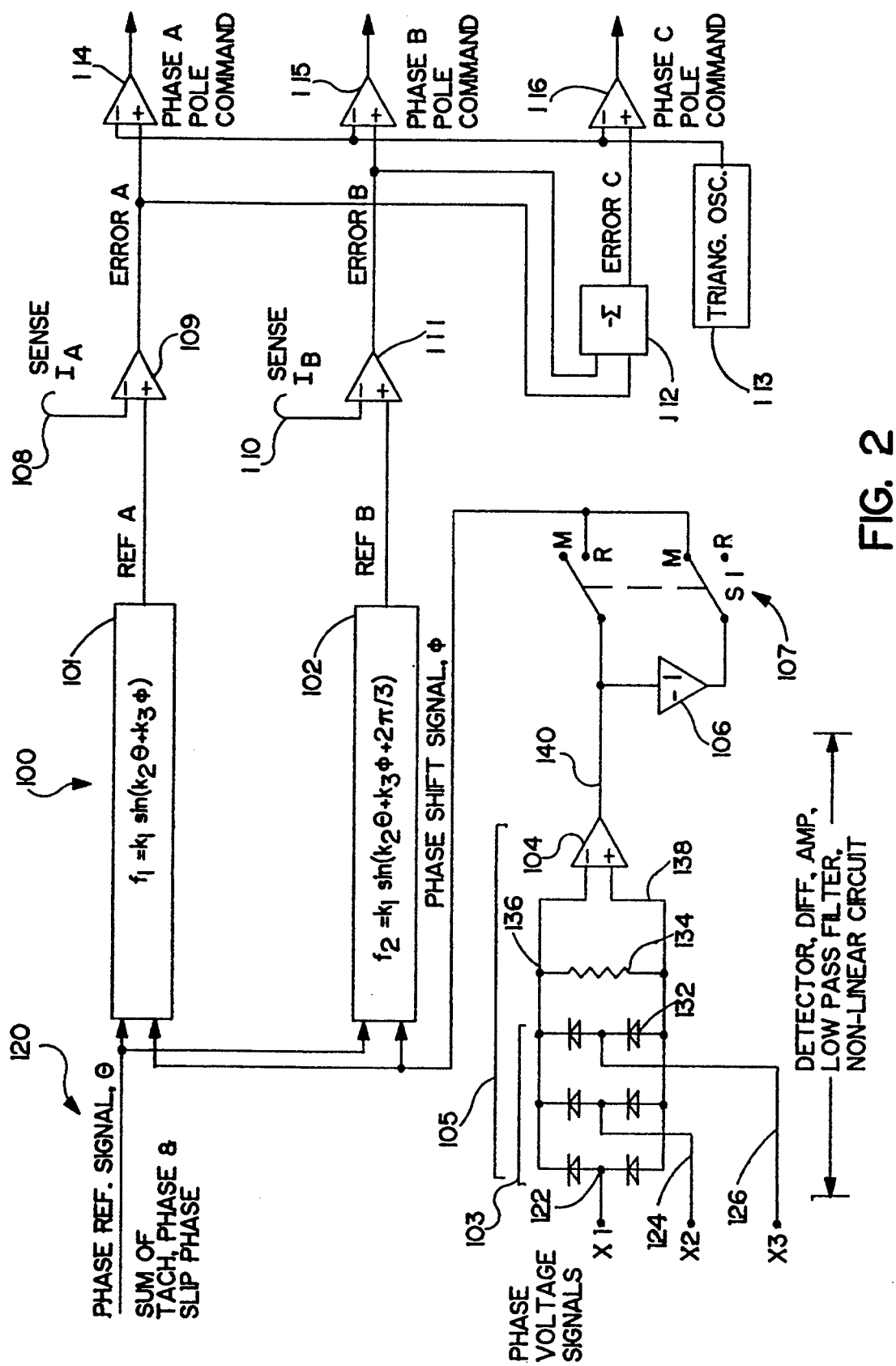
FIG. 2 illustrates modifications of the control circuit of FIG. 1 in accordance with the present invention.

Referring to FIG. 2, a preferred embodiment of the invention will now be described. FIG. 2 illustrates a stability control circuit 100' which is a modification of control circuit 100 shown in FIG. 1. Unmodified components are identified with the same reference numerals used in FIG. 1, whereas modified components are indicated by primes. The phase reference signal $\theta$ is received along input line 120 and phase voltage signals X1, X2 and X3 representative of the voltages across each winding of the motor are received along input lines 122, 124 and 126. Phase reference signal $\theta$ is the sum of tachometer phase and slip phase signals generated by tachometer and slip speed generators (not shown). The tachometer and slip speed generators may be entirely conventional. Further, the phase reference signal may be generated in accordance with conventional techniques.

Phase voltage signals X1, X2 and X3 are combined using circuit elements, described below, to produce a phase shift signal $\Phi$. Phase reference signal $\theta$ and phase shift signal $\Phi$ are both received by a first reference generator 101' and a second reference generator 102'. Reference generator 101' processes $\Phi$ and $\theta$ to produce a first reference signal $f_1$ wherein: $f_1 = k_1 \sin(k_2\theta + k_3\Phi)$. Reference generator 102' receives and processes $\Phi$ and $\theta$ to generate 102' signal $f_2$ wherein: $f_2 = k_1 \sin(k_2\theta + k_3\Phi + 2\pi/3)$. Reference signal $f_1$ is output along a line 128 as reference A and reference signal $f_2$ is output along line 130 as reference B. In the equations for $f_1$ and $f_2$, $k_1$, $k_2$ and $k_3$ are preselected constants.

Reference signal A is combined with sensed current signal $I_A$ by a differential amplifier 109. Current signal $I_A$ is received from a current sensor or detector 108 which may be entirely conventional. Differential amplifier 109 processes reference signal A and current signal $I_A$ to produce an output signal Error A which is a function of the difference between the input signals $I_A$ and reference A. Likewise, a current signal $I_B$ received from a current sensor 110 is combined with reference B via a differential amplifier 111 producing output signal Error B. Error signals A and B are both connected to a negative summation circuit 112 which generates an Error signal C. Negative summation element 112 sums signals Error A and Error to produce signal Error C.

Error signals A, B and C are connected to the non-inverting inputs of differential amplifiers 114, 115 and 116, respectively. Inverting inputs of differential amplifiers 114, 115 and 116 receive an output signal from a triangular wave oscillator 113. Differential amplifiers 114, 115 and 116 respectively combine Error signals A, B and C with the triangular wave oscillator signal to produce phase pole command signals A, B and C.

The processing of reference signals A and B, subsequent to their generation by generators 101' and 102', may be entirely conventional and will not be described in further detail. Moreover, the processing of the phase pole command signals by other components of an electrically powered motor (not shown) may be conventional and will not be described in further detail. Furthermore, techniques for constructing and operating conventional reference generators, which produce reference signals incorporating $\theta$ only, may be employed in configuring reference generators 101' and 102' of the invention. Of course, the conventional reference signal generators must be modified to receive $\Phi$ as a second input and to generate the sinusoidal output signals described above. Any conventional digital or analog circuit capable of generating the sinusoidal functions described above may be employed. As in prior art systems, reference generators 101' and 102' are conveniently implemented in the form of digital look-up tables.

The generation of phase shift signal $\Phi$ will now be described with reference to the remaining elements of FIG. 2. Phase voltage signals X1, X2 and X3 received along lines 22, 124 and 126 are fed into a rectifier network 103 comprising a set of six diodes. Network 103 detects the peak phase voltage which corresponds to the e.m.f. of the three-phase induction motor (not shown) driven by control circuit 100'. As can be seen from the drawing, input lines 122, 124 and 126 are respectively connected between pairs of diodes, generally denoted 132. The pairs of diodes are connected in parallel with a resistor 134 and inputs 136 and 138 of a low pass differential amplifier 104. Detector network 105, comprising rectifier network 103 and amplifier 104, provides a low-pass filtered signal that varies non-linearly but monotonically with respect to the motor e.m.f.

Output line 140 from amplifier 104 is split into a pair of lines which connect to the inputs of a double-pole/double-throw switch 107. Switch 107 allows for switching between a "motoring" mode M and a "regeneration" mode R. To allow stability circuit 100' to properly operate in the regeneration mode, a polarity inverter 106 is provided to reverse the polarity of the phase shift signal Φ. A reverse of the polarity of the phase shift signal is required because slip frequency is negative during regeneration such that a phase decrease is required to increase the absolute magnitude of the slip frequency, thereby ensuring stability. In an alternative embodiment, inverter 106 and switch 107 may be eliminated. In the alternative embodiment, the six diodes of network 103 are replaced by analog switches which switch in synchronism with the modulation signal followed by a signal conditioner to provide a non-linear output similar to that of detector circuit 105 and signal inverting components 106 and 107.

In either embodiment, stability control circuit 100' operates to generate phase pole command signals which are relatively immune from instability problems inherent in prior art circuits. By further incorporating a phase shift signal Φ, which advances the phase of reference signals A and B monotonically with respect to the e.m.f. of the motor when in the motoring mode and decreases the phase of the reference signals monotonically with respect to motor e.m.f. in the regeneration mode, the overall motor e.m.f. is reduced, thereby stabilizing the system. In this manner, the slip phase is appropriately adjusted without requiring modification to the slip frequency generator, or any other component of the system external to the stability control circuit illustrated. Hence, the advantages of the invention are achieved with a minimal modification of a conventional induction motor system.

Although the foregoing description of the invention has been in terms of an analog electrical circuit for generating the phase shift signal Φ, it will be appreciated that the invention may be alternatively embodied in computer software.

What has been described are exemplary embodiments of an invention set forth generally in the following claims. Those skilled in the art will appreciate that various modifications and variations may be employed consistent with the principles of the invention to achieve induction motor stability. The particular structures, circuits and elements described herein are illustrative of preferred embodiments of the invention, but do not limit the scope of the invention. Moreover, the invention may be implemented either as an apparatus or as a method.

What is claimed is:

1. A stability controller for a polyphase electric motor comprising:
   means for receiving a phase reference signal;
   means for generating a phase shift signal that increases monotonically with motor e.m.f.; and
   means for generating phase pole command signals from said phase reference and phase shift signals, wherein said means for generating phase pole command signals from a comparison of said phase reference and said phase shift signals comprises:
   a first differential amplifier receiving said phase reference signal and a first current input signal and outputting a first error signal;
   a second differential amplifier receiving said phase reference signal and a second current input signal and outputting a second error signal;
   a summer receiving said first and second error signal and outputting a negative sum of said first and second error signals;
   a triangular wave oscillator; and
   fourth, fifth and sixth differential amplifiers, each receiving a signal from said triangular wave oscillator and respectively receiving said first, second and negative sum signals, said fourth, fifth and sixth differential amplifier outputting said phase pole command signals.

* * * * *

UNITED STATES PATENT AND TRADEMARK OFFICE
CERTIFICATE OF CORRECTION

PATENT NO. : 5,355,070
DATED : October 11, 1994
INVENTOR(S) : Cocconi

It is certified that error appears in the above-indentified patent and that said Letters Patent is hereby corrected as shown below:

Column 4, line 57, delete "22" and insert --122--.

Signed and Sealed this

Fourteenth Day of March, 1995

Attest:

BRUCE LEHMAN

Attesting Officer *Commissioner of Patents and Trademarks*